US 012491574B2

(12) United States Patent
Weeks et al.

(10) Patent No.: US 12,491,574 B2
(45) Date of Patent: Dec. 9, 2025

(54) TIG WELDING SYSTEM

(71) Applicant: Lincoln Global, Inc., Santa Fe Springs, CA (US)

(72) Inventors: Matthew A. Weeks, Walloon (AU); Bryan O'Neil, Double Oak, TX (US); Christopher J. Williams, Norham (GB); Dale A. Johannesen, Narangba (AU)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 968 days.

(21) Appl. No.: 17/673,882

(22) Filed: Feb. 17, 2022

(65) Prior Publication Data

US 2022/0305579 A1 Sep. 29, 2022

Related U.S. Application Data

(60) Provisional application No. 63/167,447, filed on Mar. 29, 2021.

(51) Int. Cl.
*B23K 9/133* (2006.01)
*B23K 9/16* (2006.01)
*B23K 26/348* (2014.01)

(52) U.S. Cl.
CPC .......... *B23K 9/1336* (2013.01); *B23K 26/348* (2015.10); *B23K 9/16* (2013.01)

(58) Field of Classification Search
CPC ...... B23K 9/16; B23K 9/1333; B23K 9/1336; B23K 26/348
See application file for complete search history.

(56) References Cited

U.S. PATENT DOCUMENTS 4,136,273 A 1/1979 Eujita et al.
4,614,856 A 9/1986 Hori et al.
(Continued)

FOREIGN PATENT DOCUMENTS

CN 201807819 U 4/2011
CN 108788389 A 11/2018
(Continued)

OTHER PUBLICATIONS

Zheng, et al.; "Twin Wire Gas Tungsten Arc Cladding;" Singapore Institute of Manufacturing Technology; https://www.researchgate.net/publication/237535550_Twin_Wire_Gas_Tungsten_Arc_Cladding; Published May 23, 2014; pp. 1-10.
(Continued)

*Primary Examiner* — Brian W Jennison
(74) *Attorney, Agent, or Firm* — Brad C. Spencer

(57) ABSTRACT

A gas tungsten arc welding torch includes a handle and a nozzle located distal of the handle and having a central bore. First and second tungsten electrodes are located partially within the central bore of the nozzle. The torch includes at least one filler wire channel that terminates radially inward of the first tungsten electrode and the second tungsten electrode. The torch includes a torch trigger. Operation of the torch trigger controls delivery of a first filler wire and a second filler wire through the at least one filler wire channel. The torch includes a wire feed speed control. Operation of the wire feed speed control adjusts a wire feed speed of both of the first filler wire and the second filler wire.

25 Claims, 7 Drawing Sheets

(56) References Cited

U.S. PATENT DOCUMENTS

| | | | |
|---|---|---|---|
| 5,347,098 | A | 9/1994 | Murakami et al. |
| 5,977,504 | A | 11/1999 | Offer et al. |
| 6,040,545 | A | 3/2000 | Taki et al. |
| 9,457,420 | B2 | 10/2016 | Chen et al. |
| 2008/0156783 | A1 | 7/2008 | Vanden Heuvel et al. |
| 2010/0096436 | A1* | 4/2010 | Nangle .................. B23K 9/095 228/41 |
| 2017/0304923 | A1 | 10/2017 | Ash |
| 2018/0050414 | A1 | 2/2018 | Hughes |
| 2020/0189019 | A1* | 6/2020 | Bombardier ....... B23K 35/0266 |

FOREIGN PATENT DOCUMENTS

| | | | |
|---|---|---|---|
| CN | 108788395 | A | 11/2018 |
| CN | 108 907 414 | B | 3/2020 |
| CN | 111730177 | A | 10/2020 |
| DE | 224 515 | A1 | 7/1985 |
| DE | 35 42 987 | A1 | 6/1987 |
| EP | 2 644 306 | A1 | 10/2013 |
| IN | 201621014529 | A | 10/2017 |
| JP | S60-210370 | A | 10/1985 |
| NO | 343141 | B1 | 11/2018 |
| WO | 96/01717 | A1 | 1/1996 |
| WO | 2004/028738 | A2 | 4/2004 |

OTHER PUBLICATIONS

International Search Report for Corresponding Application No. PCT/US2022/022160; Dated Jul. 27, 2022; pp. 1-31.

* cited by examiner

TIG WELDING SYSTEM

CROSS-REFERENCE TO RELATED APPLICATIONS

The present application claims priority to U.S. Provisional Patent Application Ser. No. 63/167,447 filed on Mar. 29, 2021, the disclosure of which is incorporated herein by reference.

BACKGROUND OF THE INVENTION

Field of the Invention

In general, the present invention relates to an improved tungsten inert gas (TIG) welding system. More particularly, the present invention relates to an improved TIG welding torch.

Description of Related Art

Welding systems reside at the core of the modern industrial age. From massive automobile assembly operations to automated manufacturing environments, these systems facilitate joining in ever more complicated manufacturing operations. Hot or cold wire welding processes a wire or electrode being heated (e.g., via current) and received by a puddle created by a main heat source (e.g., plasma arc, tungsten inert gas (TIG) welding, metal inert gas (MIG) welding, flux core, laser, among others).

TIG welding may be used in various welding operations including orbital welding and non-orbital welding, manual welding or automated welding operations. Conventional manual TIG welding employs a tungsten electrode, and requires a user to feed welding filler wire manually while also controlling the amperage of the system. This requires high skill and dexterity. Further, while TIG welding produces high quality welds, productivity rates are low.

BRIEF SUMMARY OF THE INVENTION

The following summary presents a simplified summary in order to provide a basic understanding of some aspects of the devices, systems and/or methods discussed herein. This summary is not an extensive overview of the devices, systems and/or methods discussed herein. It is not intended to identify critical elements or to delineate the scope of such devices, systems and/or methods. Its sole purpose is to present some concepts in a simplified form as a prelude to the more detailed description that is presented later.

In accordance with one aspect of the present invention, provided is a gas tungsten arc welding torch. The torch includes a handle and a nozzle located distal of the handle and having a central bore. A first tungsten electrode is located partially within the central bore of the nozzle and a second tungsten electrode is located partially within the central bore of the nozzle. At least one filler wire channel in the torch terminates radially inward of the first tungsten electrode and the second tungsten electrode. The torch includes a torch trigger, wherein operation of the torch trigger controls delivery of a first filler wire through the at least one filler wire channel and delivery of a second filler wire through the at least one filler wire channel. The torch includes a wire feed speed control, wherein operation of the wire feed speed control adjusts a wire feed speed of both of the first filler wire and the second filler wire.

In accordance with another aspect of the present invention, provided is a gas tungsten arc welding torch. The torch includes a handle and a gas cup. A first tungsten electrode is located partially within the gas cup, and a second tungsten electrode located partially within the gas cup. At least one filler wire channel in the torch terminates radially inward of the first tungsten electrode and the second tungsten electrode. The torch includes a torch trigger, wherein operation of the torch trigger controls delivery of a first filler wire through the at least one filler wire channel and delivery of a second filler wire through the at least one filler wire channel.

In accordance with another aspect of the present invention, provided is a gas tungsten arc welding system. The system includes a welding torch. The torch includes a handle and a gas cup having a central bore. A first tungsten electrode is located partially within the central bore of the gas cup, and a second tungsten electrode is located partially within the central bore of the gas cup. At least one filler wire channel in the torch terminates radially inward of the first tungsten electrode and the second tungsten electrode. The torch includes a torch trigger, wherein operation of the torch trigger controls delivery of a first filler wire through the at least one filler wire channel and delivery of a second filler wire through the at least one filler wire channel. The torch includes a wire feed speed control, wherein operation of the wire feed speed control adjusts a wire feed speed of both of the first filler wire and the second filler wire. The system includes a welding power source configured to simultaneously supply welding power to both of the first tungsten electrode and the second tungsten electrode, and a wire feeder configured to feed the first filler wire through the at least one filler wire channel and the second filler wire through the at least one filler wire channel at said wire feed speed.

BRIEF DESCRIPTION OF THE DRAWINGS

The foregoing and other aspects of the invention will become apparent to those skilled in the art to which the invention relates upon reading the following description with reference to the accompanying drawings, in which.

DETAILED DESCRIPTION OF THE INVENTION

Embodiments of the invention relate to methods and systems that relate to a tungsten inert gas (TIG) welding system, also known as a gas tungsten arc welding (GTAW) system. The system can perform a semi-automatic hot wire or cold wire TIG welding process, and includes one, two, or more welding filler wires that can be delivered through a single welding torch body towards one or more arcs created by one or more tungsten electrodes of the welding torch. Wire feeding and welding current can be controlled independently of one another by using controls on the welding torch to control aspects of the welding process including arc pressure and weld pool temperature, which can be used to maximize the deposition rate.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. Any disjunctive word or phrase presenting two or more alternative terms, whether in the description of embodiments, claims, or drawings, should be understood to contemplate the possibilities of including one of the terms, either of the terms, or both terms. For example, the phrase "A or B" should be understood to include the possibilities of "A" or "B" or "A and B."

"Welding" or "weld" as used herein including any other formatives of these words will refer to depositing of molten material through the operation of an electric arc including but not limited to submerged arc, GMAW, MAG, MIG, TIG welding, or any electric arc used with a semi-automatic or an automatic welding system (e.g., an orbital welding system, a robotic arm welding system, etc.) In addition to welding operations, embodiments of the present invention can be used in additive manufacturing processes and other welding-type processes, such as hardfacing. Thus, the term "welding" is to be interpreted to include such welding-type processes.

Figure 1:
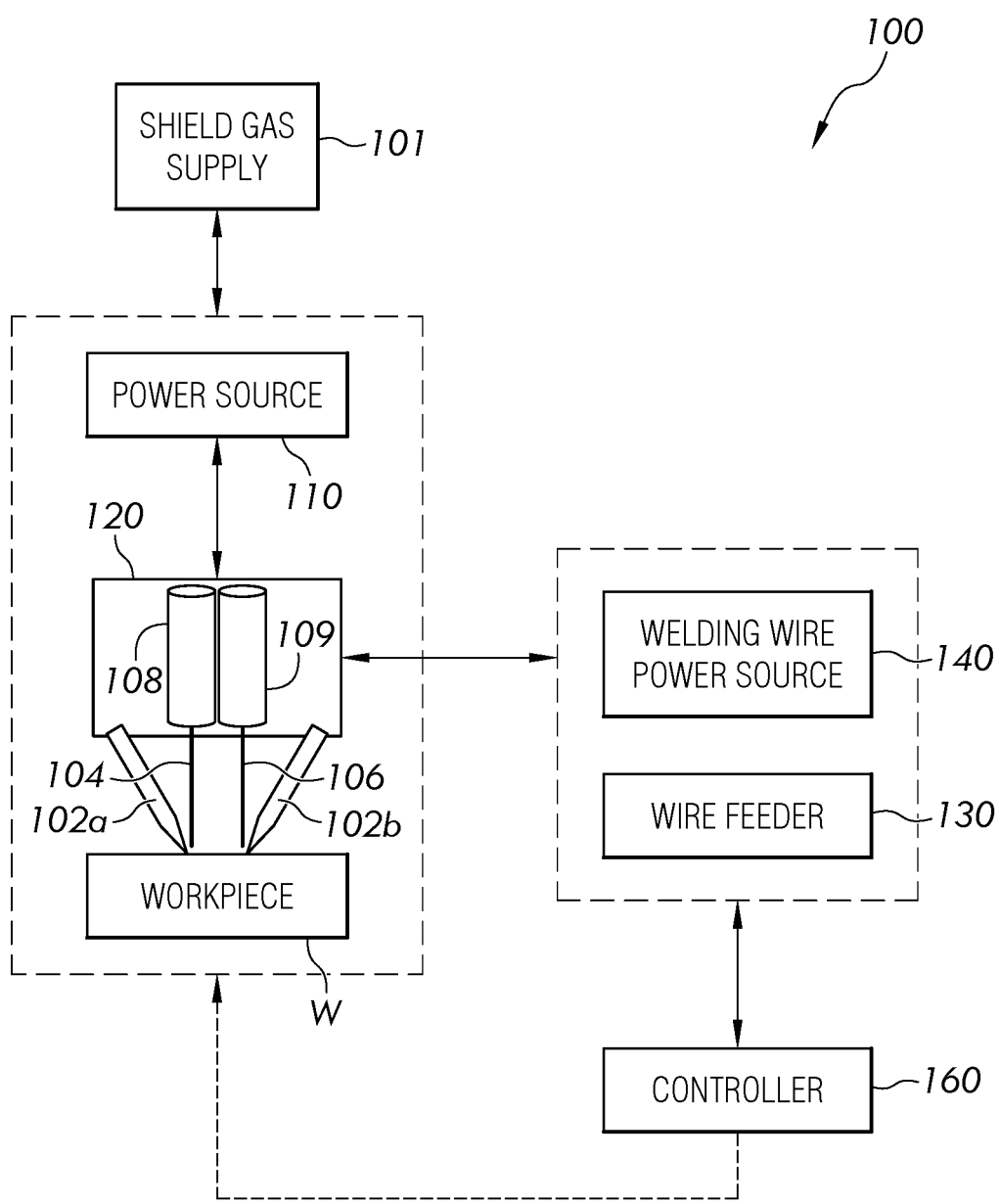
FIG. 1 is a schematic view of an exemplary welding system.

The best mode for carrying out the invention will now be described for the purposes of illustrating the best mode known to the applicant at the time of the filing of this patent application. The examples and figures are illustrative only and not meant to limit the invention, which is measured by the scope and spirit of the claims. Referring now to the drawings, wherein the showings are for the purpose of illustrating an exemplary embodiment of the invention only and not for the purpose of limiting same, FIG. 1 illustrates a welding system that is used with a manual, automated or semi-automated welding system. One illustrative example of a welding system is a TIG or GTAW welding system.

FIG. 1 illustrates an example of a schematic embodiment of a TIG welding system 100 (also referred to as welder, system, welding system, and/or welder system). Welding system 100 includes a welding power source 110 and a controller 160. The controller 160 may be made part of power source 110 or be a remote controller such as a pendant or other remote device for operator control. When a remote controller is used, communication between the remote controller and the welder may be made in any known wired or wireless form of communication. In one example, controller 160 is carried within a housing of power source 110 of welder 100. The subject innovation can be used with any welding operation that includes an arc and a hot or cold wire that is liquefied to deposit welding material onto a workpiece.

Controller 160 may be any suitable controller including a programmable logic controller or computer based controller. To provide additional context for various aspects of the present invention, the following discussion is intended to provide a brief, general description of a suitable computing environment in which the various aspects of the present invention may be implemented. While aspects of the invention are described herein in the general context of computer-executable instructions that may run on one or more computers, those skilled in the art will recognize that the invention also may be implemented in combination with other program modules and/or as a combination of hardware and/or software. Generally, program modules include routines, programs, components, data structures, etc., that perform particular tasks or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices. For instance, a remote database, a local database, a cloud-computing platform, a cloud database, or a combination thereof can be utilized with processing components.

Controller 160 can utilize an exemplary environment for implementing various aspects of the invention including a computer, wherein the computer includes a processing unit, a system memory and a system bus. The system bus couples system components including, but not limited to the system memory to the processing unit. The processing unit may be any of various commercially available processors. Dual microprocessors and other multi-processor architectures also can be employed as the processing unit.

The system bus can be any of several types of bus structure including a memory bus or memory controller, a peripheral bus and a local bus using any of a variety of commercially available bus architectures. The system memory can include read only memory (ROM) and random access memory (RAM). A basic input/output system (BIOS), containing the basic routines that help to transfer information between elements within controller 160, such as during start-up, is stored in ROM.

Controller 160 can further include a hard disk drive, a magnetic disk drive, e.g., to read from or write to a removable disk, and an optical disk drive, e.g., for reading a CD-ROM disk or to read from or write to other optical media. Controller 160 can include at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media, which may be referred to simply as memory, includes, but is not limited to, RAM, ROM, EEPROM, flash memory or other memory technology, CD-ROM, digital versatile disks (DVD) or other magnetic storage devices, or any other medium which can be used to store the desired information and which can be accessed by controller 160.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, Radio Frequency (RF), Near Field Communications (NFC), Radio Frequency Identification (RFID), infrared, and/or other wireless media. Combinations of any of the above should also be included within the scope of computer readable media.

A number of program modules may be stored in the drives and RAM, including an operating system, one or more application programs, other program modules, and program data. The operating system in controller 160 can be any of a number of commercially available operating systems or a custom operating system.

In addition, a user may enter commands and information into the computer through a keyboard and a pointing device, such as a mouse. Other input devices may include a microphone, an IR remote control, a track ball, a pen input device, a joystick, a game pad, a digitizing tablet, a satellite dish, a scanner, or the like. These and other input devices are often connected to the processing unit through a serial port interface that is coupled to the system bus, but may be connected by other interfaces, such as a parallel port, a game port, a universal serial bus ("USB"), an IR interface, and/or various wireless technologies. A monitor (e.g., display), or other type of display device, may also be connected to the system bus via an interface, such as a video adapter. Visual output may also be accomplished through a remote display network protocol such as Remote Desktop Protocol, VNC, X-Window System, etc. In addition to visual output, a computer typically includes other peripheral output devices, such as speakers, printers, etc.

A display can be employed with controller 160 to present data that is electronically received from the processing unit. For example, the display can be an LCD, plasma, CRT, etc. monitor that presents data electronically. Alternatively or in addition, the display can present received data in a hard copy format such as a printer, facsimile, plotter etc. The display can present data in any color and can receive data from controller 160 via any wireless or hard wire protocol and/or standard. In another example, controller 160 and/or system can be utilized with a mobile device such as a cellular phone, a smart phone, a tablet, a portable gaming device, a portable Internet browsing device, a Wi-Fi device, a Portable Digital Assistant (PDA), among others.

The computer can operate in a networked environment using logical and/or physical connections to one or more remote computers. The remote computer(s) can be a workstation, a server computer, a router, a personal computer, microprocessor based entertainment appliance, a peer device or other common network node, and typically includes many or all of the elements described relative to the computer. The logical connections depicted include a local area network (LAN) and a wide area network (WAN). Such networking environments are commonplace in offices, enterprise-wide computer networks, intranets and the Internet.

When used in a LAN networking environment, the computer is connected to the local network through a network interface or adapter. When used in a WAN networking environment, the computer typically includes a modem, or is connected to a communications server on the LAN, or has other means for establishing communications over the WAN, such as the Internet. In a networked environment, program modules depicted relative to the computer, or portions thereof, may be stored in the remote memory storage device. It will be appreciated that network connections described herein are exemplary and other means of establishing a communications link between the computers may be used.

Alternatively or in addition, a local or cloud (e.g., local, cloud, remote, among others) computing platform can be utilized for data aggregation, processing, and delivery. For this purpose, the cloud computing platform can include a plurality of processors, memory, and servers in a particular remote location. Under a software-as-a-service paradigm, a single application is employed by a plurality of users to access data resident in the cloud. In this manner, processing requirements at a local level are mitigated as data processing is generally done in the cloud, thereby relieving user network resources. The software-as-a-service application allows users to log into a web-based service (e.g., via a web browser) which hosts all the programs resident in the cloud.

In an example, a plurality of users can access a local or cloud database (e.g., local database, cloud database, remote database, among others) computing platform (e.g., controller 160) via a web-based application on a computing device, such as a tablet, pad, laptop, cell phone, computer, or other component. The web-based application can allow a user to configure particular reports that quantify data in substantially any format and in comparison to any number of metrics, such as performance benchmarks and the like. Moreover, the software applications can be updated and distributed in a global fashion to insure that each user is using the latest and greatest technology.

With reference to FIG. 1, welding system 100 is a TIG welder having a welding torch or gun, generally indicated at 120, electrically connected to power source 110. Torch 120 can include a first tungsten-based electrode 102a, and a second tungsten-based electrode 102b, a first consumable welding wire 104 (e.g., a first filler wire), and a second consumable welding wire 106 (e.g., a second filler wire) that are used to deposit weld material to form a weld joint on workpiece W. In certain embodiments, the power source 110 can be a single welding power source that is configured to simultaneously supply welding power to both the first electrode 102a and the second electrode 102b. In other embodiments, the power source 110 can include two welding power sources, where each of the two welding power sources is configured to power one of the first electrode 102a or the second electrode 102b. It should be appreciated that the first welding wire 104 and the second welding wire 106 can be either "cold" wires (e.g. de-energized), or "hot" wires and be energized by, for example, the welding wire power source 140. Thus, the wires 104, 106 can be energized hot wires heated by an electrical current flow through the wires. Further, in certain embodiments, the first welding wire 104 and the second welding wire 106 can be energized using DC or AC power, and could be both DC, both AC, or one wire AC and one wire DC. The first electrode 102a and the second electrode 102b can each have a length suitable for the given welding application, however, any suitable length may be selected. For example, the first electrode 102a and the second electrode 102b can have a length from 4-6 inches, and can be attached to the welding torch 120 with a collet type holder. The diameter of the electrodes and filler wires can be selected from standard size electrodes and wires or custom diameters may be selected. The first electrode 102a and the second electrode 102b can be angled inwards towards the first consumable welding wire 104 and the second consumable welding wire 106. The orientation, spacing and angle of delivery of the first welding wire 104 and/or the second welding wire 106 can be optimized to maximize control of the welding pool in and out of position, on plate or pipe welding. This includes open root welds on pipe made from similar or dissimilar materials joined together that can include, but is not limited to aluminum, austenitic, duplex and super-duplex stainless steel, and all grades of quench and tempered, high strength low alloy carbon and plain carbon steel pipes common to the operation of a system delivering gases or liquids.

As depicted in FIG. 1, the first welding wire 104 and the second welding wire 106 can be arranged such that they each pass through the welding torch 120 and exit the torch head in between the first electrode 102a and the second electrode 102b. The first electrode 102a and the second electrode 102b can be configured to create a first arc and a second arc with the workpiece W. The first welding wire 104 and the second welding wire 106 can be fed in between the first arc and the second arc and drawn into a weld pool on the workpiece W that is created by the first arc and the second arc. In another embodiment, the torch 120 can include a single electrode 102a. In this embodiment, the first welding wire 104 and the second welding wire 106 can be arranged such that they pass through the welding torch 120 and exit the torch head on opposite sides of the electrode 102a. The first welding wire 104 and the second welding wire 106 can exit the torch head at an angle towards the tip of the electrode 102a.

Welding torch 120 is connected to shield gas supply 101 that provides a shielding gas such as Argon gas to welding torch 120. Shield gas supply 101 can be a container, such as a cylinder, that stores shield gas under pressure and delivery of shield gas, is effected via appropriate tubing or other conduits. The shield gas supply discharge pressure and/or flow rate can be controlled by a regulator or other controller. A non-pressurized source may be used also with gas delivery provided by a pump or the like. When welding thick plates or heavy wall pipes, the weld joint design typically provides a narrow groove to permit an elongated electrode to be placed in the joint with some adjustment of the torch angle to assure a good weld created by layering a series of weld beads upon each other until the joint is filled. This process may be referred to as narrow groove welding or deep groove welding interchangeably throughout the following description. Narrow groove welding is a process where successive single bead weld layers are applied on top of one another in a narrow groove or joint. One of the considerations in the narrow groove environment is maintaining sufficient shield gas to protect the molten weld puddle from atmospheric contamination. Typically, an inert shield gas, such as Argon, is provided from outside the weld joint with a long electrode extending into the groove below the shield gas supply.

The welding system can include a wire feeder 130 connected to a supply of the first welding wire 104 and the second welding wire 106. The wire feeder 130 is configured to feed the first welding wire 104 and the second welding wire 106 through the welding torch 120. The welding torch 120 includes at least one filler wire channel in and/or through the torch for conveying the first welding wire 104 and the second welding wire 106 to the distal end of the torch and to the weld zone established by the arcs from the electrodes 102a, 102b. The at least one filler wire channel can terminate radially inward of the first and second electrodes 102a, 102b at the distal end of the torch so that the filler wires 104, 106 exit the torch between the electrodes. In certain embodiments, the welding torch 120 can include a first filler wire channel 108 and a second filler wire channel 109. The first filler wire channel 108 can guide the first welding wire 104 through the welding torch 120 towards a weld pool created by the arcs created by the electrodes 102a and 102b, and the second filler wire channel 109 can guide the second welding wire 106 through the welding torch 120 towards a weld pool created by the arcs created by the electrodes 102a and 102b. The filler wire channels 108, 109 can be circular and spaced apart from each other or overlap slightly (e.g., to form a substantially FIG. 8 shape). The at least one filler wire channel could have any number of shapes, such as a circular shape, an oval shape, an obround shape, a lemniscate shape, or an overlapping circles shape (e.g., a substantially FIG. 8 shape) formed by two or more overlapping circular bores for individual filler wires, or another appropriate shape.

In certain embodiments, a single wire feeder 130 can be used to feed both the first welding wire 104 and the second welding wire 106 through the at least one filler wire channel in the torch at a desired wire feed speed. In these embodiments, a split spool can be incorporated to store and feed both the first welding wire 104 and the second welding wire 106. In other embodiments, two separate spools can be used such that the first welding wire 104 is stored and fed by a first spool and the second welding wire 106 is stored and fed by a second spool. In still further embodiments, a separate wire feeder can be used for each of the first welding wire 104 and the second welding wire 106.

It is to be appreciated and understood that system 100 can include various configurations and embodiments and the configuration in system 100 is not to be limiting on the subject innovation. For example, wire feeder 130 can be a stand-alone component (as depicted), incorporated into power source 110, controller 160, welding torch 120 or other component of system 100. It is to be appreciated that welding wire power source 140 and power source 110 can be separate sources, a single power source, or a combination thereof. System 100 can further include a controller 160 that is configured to control various welding parameters involved with the TIG welding process, and can also be configured to control the various operations of the welding torch 120 disclosed herein. Controller 160 can be a stand-alone component, incorporated into power source 110, incorporated into torch 120, or a component of system 100.

Figure 2:
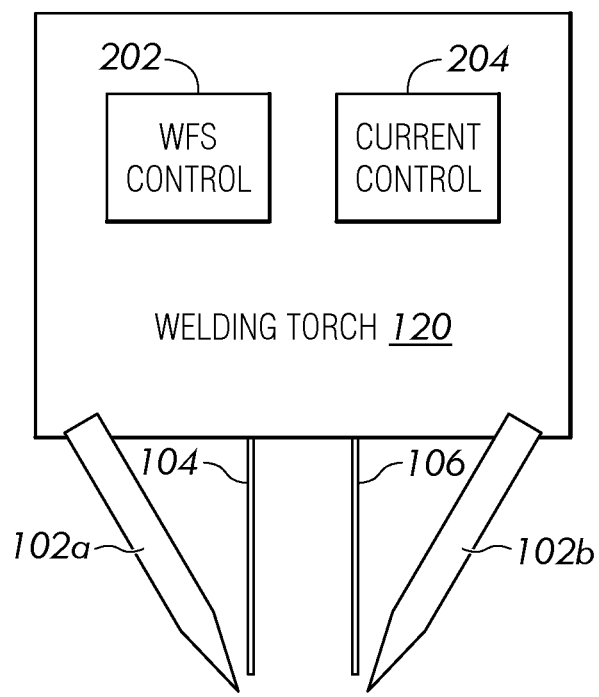
FIG. 2 is a schematic view of an exemplary welding torch.
Figure 3:
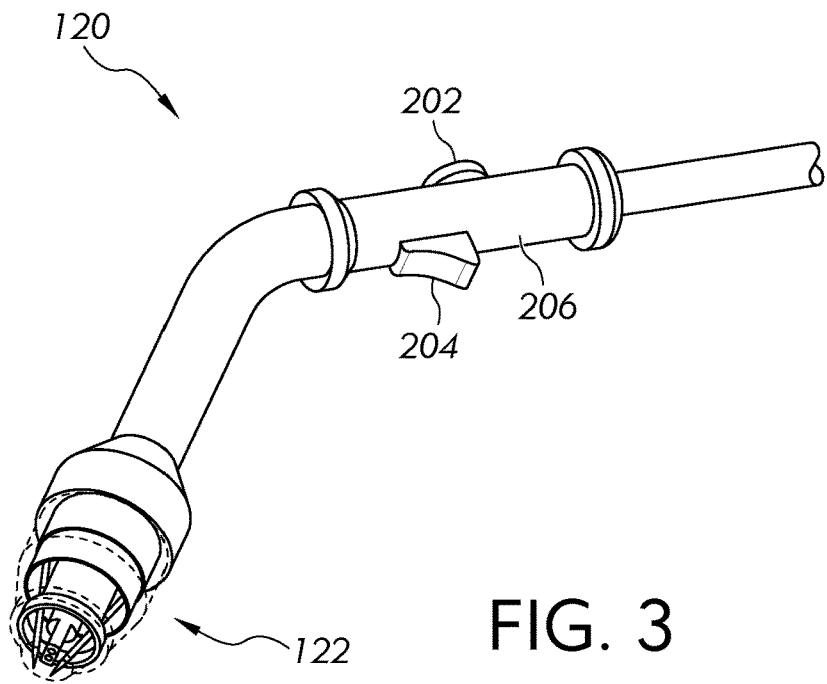
FIG. 3 is a perspective view of a welding torch according to one embodiment of a welding system.
Figure 4:
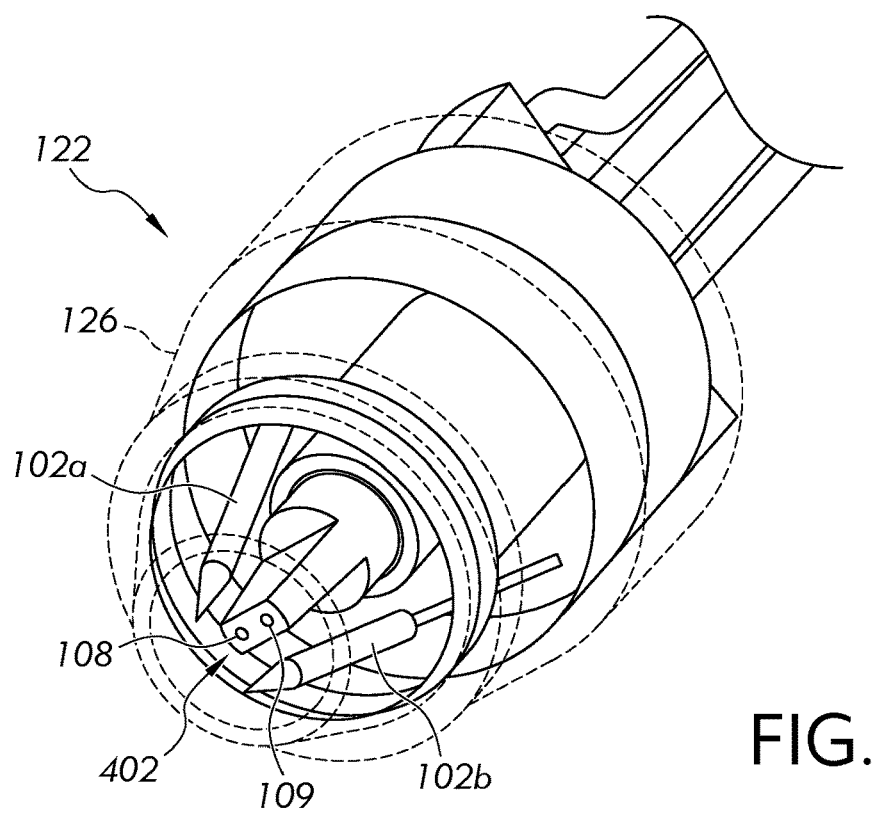
FIG. 4 is a transparent detailed view of a torch head of the welding torch depicted in FIG. 3.

Turning now to FIGS. 2-4, an exemplary welding torch 120 and corresponding torch head 122 are shown. The welding torch 120 can be liquid cooled. A cooling conduit can extend through the welding torch 120 to allow a coolant such as water to circulate through the welding torch 120. The welding torch 120 allows a user to perform a TIG welding process while controlling aspects of the welding process directly from the welding torch 120. For example, the welding torch 120 can include a wire feed speed control 202 to provide a user with variable control of the wire feed speed, and a welding current control 204 to provide the user with variable control of the welding current. The wire feed speed control 202 and the welding current control 204 can be operatively connected to the welding power source 110 and the controller 160 to adjust the wire feed speed and welding current and initiate and terminate the welding operation. Operation of the wire feed speed control 202 can adjust a wire feed speed of both of the first filler wire 104 and the second filler wire 106. The wire feed speed control 202 can be, for example, a thumbwheel, a slider, a knob, a dial, one or more switches, one or more buttons, a digital input, or a trigger, among others. Similarly, the welding current control 204 can be, for example, a thumbwheel, a slider, a knob, a dial, one or more switches, one or more buttons, a digital input, or a trigger, among others. In an exemplary embodiment, the wire feed speed control 202 is a thumbwheel and the welding current control 204 is a torch trigger. In this embodiment, a user can control the welding current by depressing the trigger. For example, the user can depress the trigger slightly to achieve a lower welding current, and can further depress the trigger to achieve a higher welding current. Operation of the torch trigger, for example, provides the user with a variable control of the welding current level in the first tungsten electrode 102a and the second tungsten electrode 102b from a first current level flowing between the electrodes and workpiece through a second current level (e.g., higher or lower than the first current level) flowing between the electrodes and the workpiece. Also in this embodiment, the user can control the wire feed speed independently from the welding current by using the thumbwheel. With this arrangement, a user is able to independently control the wire feed speed and the welding current during a welding process. In still a further embodiment, the welding torch 120 can include two wire feed speed controls—one to control the first welding wire 104 and the other to control the second welding wire 106. In another exemplary embodiment, the wire feed speed control 202 is a first trigger, and the welding current control 204 is a second trigger. It should be appreciated that by allowing the user to independently control wire feed speed and welding current, the user can control the arc pressure, surface tension, and current transferred to the workpiece W. The wire feed speed control 202 and the welding current control 204 can be located near each other on or adjacent to a handle 206 (FIG. 3) of the welding torch 120.

A user can operate the welding system 100 by utilizing the controls 202, 204 located on the welding torch 120 (e.g., on or near the handle 206). In one example, an arc is initiated between the at least one electrode 102a, 102b and the workpiece W in response to a first trigger pull by a user. As a weld pool heats up on the workpiece, the user can then activate the wire feeder 130 to cause the first welding wire 104 and the second welding wire 106 to pass through the welding torch and into the weld pool. Operation of the torch trigger can control the delivery of the first filler wire 104 through the at least one filler wire channel and delivery of the second filler wire 106 through the at least one filler wire channel. For example, the user can activate the wire feeder 130 by a second trigger pull. It should be appreciated that a trigger on the welding torch 120 can be configured to perform multiple functions. For example, as in the previous example, a first trigger pull initiates an arc between the one or more electrodes 102a, 102b, and the workpiece W, and a second trigger pull starts the wire feed for the first welding wire 104 and the second welding wire 106. After the arc is initiated and the wire feed is started, the trigger can then function as the welding current control 204 and the wire feed speed can be adjusted via the wire feed speed control 202. The wire feed speed control 202 could also be configured to activate the wire feeder 130, such as by incorporating a pushbutton switch into the thumbwheel for example.

As shown in FIG. 4, the welding torch 120 can include gas cup 126 on the torch head 122. The gas cup 126 is also known as a nozzle. The torch head 122 includes, among other things, the gas cup 126 and the tungsten electrodes 102a, 102b, and is located at the distal end of the torch 120 distal of the handle 206 (FIG. 3). The gas cup 126 is configured to partially contain and direct the shielding gas over the weld pool. The gas cup 126 can generally have a tapered, hollow, frustoconical shape so as to form a central bore for conveying and directing the discharge of shielding gas. The tungsten electrodes 102a, 102b are located partially within and extend longitudinally within the central bore of the gas cup 126. The tungsten electrodes 102a, 102b are located partially within the gas cup 126 because they extend longitudinally out of the gas cup and past the distal terminal end face of the gas cup. In certain embodiments, the gas cup 126 can be ceramic and/or formed by an injection molding process. The gas cup 126 can also be formed from a suitable metallic material. The electrodes 102a, 102b and the first welding wire 104 and the second welding wire 106 can each extend through the gas cup 126 and past its distal terminal end face. In the exemplary weld torch 120 depicted in FIG. 4, the first filler wire channel 108 and the second filler wire channel 109 extend through a center of the torch head 122 and terminate through a tip 402. The tip 402 is configured to feed the first welding wire 104 and the second welding wire 106 precisely into the weld puddle created by the one or more arcs produced between the one or more electrodes 102a, 102b, and the workpiece W. It should be appreciated that the tip 402 can be made out of any suitable material such as copper. The tip 402 can be molded into the gas cup 128 or it may be attached, such as by threading the tip 402 into the gas cup 126. In a hot wire welding application, the tip 402 can be formed from a conductive material, such as copper, to conduct heating electrical current to the filler wires 104, 106. The tip 402 is shown as forming the terminal portions of the first filler wire channel 108 and the second filler wire channel 109. Rather than having two separate channels, the tip 402 could have a common channel for accommodating both wires 104, 106 together, and the common channel could have any number of shapes as discussed above, such as a circular shape, an oval shape, an obround shape, a lemniscate shape, an overlapping circles shape (e.g., a substantially FIG. 8 shape) formed by two or more overlapping circular bores for individual filler wires, or another appropriate shape.

In the embodiment shown in FIG. 4, the first electrode 102a and the second electrode 102b extend from the torch head 122 and through the gas cup 126 within its central bore at an inward angle, so that the first electrode 102a and the second electrode 102b extend towards the first welding wire 104 and the second welding wire 106. The wires 104, 106 can be fed through the tip 402 and between the electrodes 102a, 102b to be oriented generally parallel to the axis of the torch head 122, whereas the electrodes 102a, 102b can form acute angles with the wires and the axis of the torch head. The first electrode 102a and the second electrode 102b can extend from the torch head 122 and through the gas cup 126 at precise angles relative to arc plasma formed during the welding process.

In one embodiment, the one or more electrodes 102a, 102b can be fixed to the torch head 122 using a collet clamping ring, although any suitable attachment approach could be used. Further, the gas cup 126 having the first welding wire 104 and the second welding wire 106 passing through can be rotatable between 0 and 180 degrees, which allows a user to adjust a position and orientation of the first welding wire 104 and the second welding wire 106 with respect to the one or more electrodes 102a, 102b.

Figure 5:
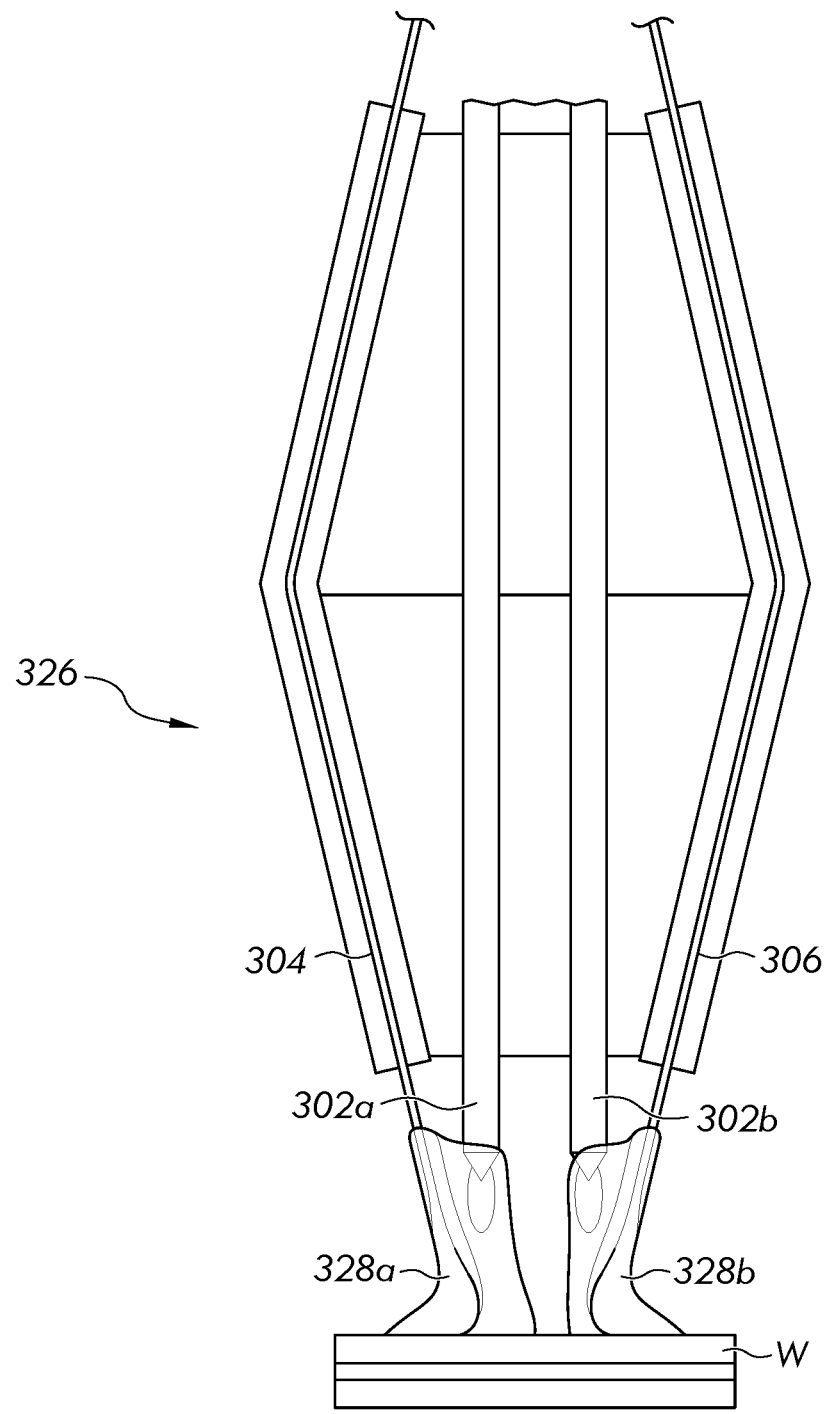
FIG. 5 is a diagram of an exemplary weld process performed by one embodiment of a welding system.

Turning now to FIG. 5, a cross section view of a further exemplary torch head is shown. In this embodiment, the first electrode 302a and the second electrode 302b extend through and project out of the gas cup 326 and are configured to create a first arc 328a and a second arc 328b. The first welding wire 304 and the second welding wire 306 also extend through the gas cup 326 outside of the electrodes 302a, 302b, and exit the gas cup 326 at an inward angle such that the first welding wire 304 and the second welding wire 306 are directed towards the first arc 328a and the second arc 328b. The exit angle of the first welding wire 304 and the second welding wire 306 from the torch head can be selected as to determine where the welding wires enter the weld pool created by the first arc 328a and the second arc 328b. In one embodiment, the exit angle can be selected so that the welding wires 304, 306 enter an edge of the weld pool. In another embodiment, the exit angle is selected so that the welding wires 304, 306 enter at the top of the arc cone just below the respective electrode 302a, 302b (e.g. a 40 degree grind angle), to cause a droplet to transfer across the arc. In one embodiment, the exit angle of the welding wires 304, 306 is selected so that the welding wire is at an angle of 20 degrees with respect to the respective electrode.

Figure 6:
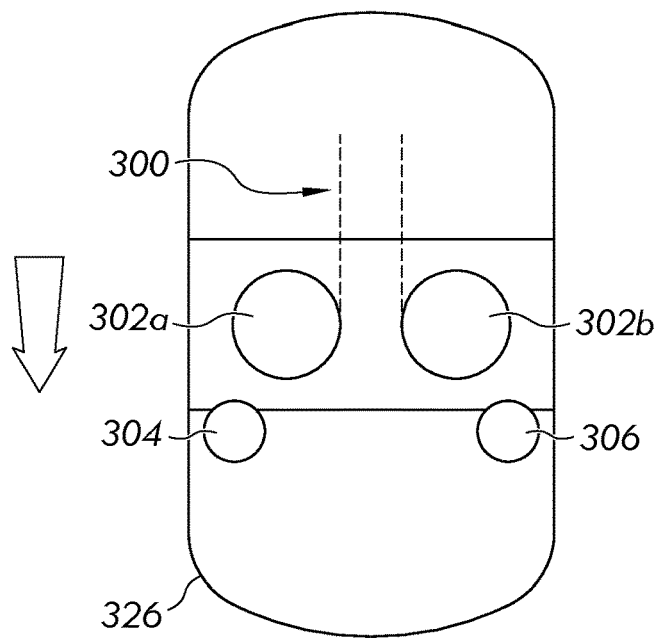
FIG. 6 is a top view depicting locations of the electrodes and wires according to one embodiment of a welding system.

Turning now to FIG. 6, a top view of the gas cup 326 arrangement and the arrangement of the first electrode 302a, the second electrode 302b, the first welding wire 304, and the second welding wire 306 is shown. In this embodiment, the gas cup 326 has an oblong shape with rounded ends. It should be appreciated that the gas cup 326 can be other shapes such as circular or rectangular. An electrode spacing 300 is shown between the first electrode 302a and the second electrode 302b. The electrode spacing 300 can be selected based on certain requirements such as desired weld pool size.

Figure 7:
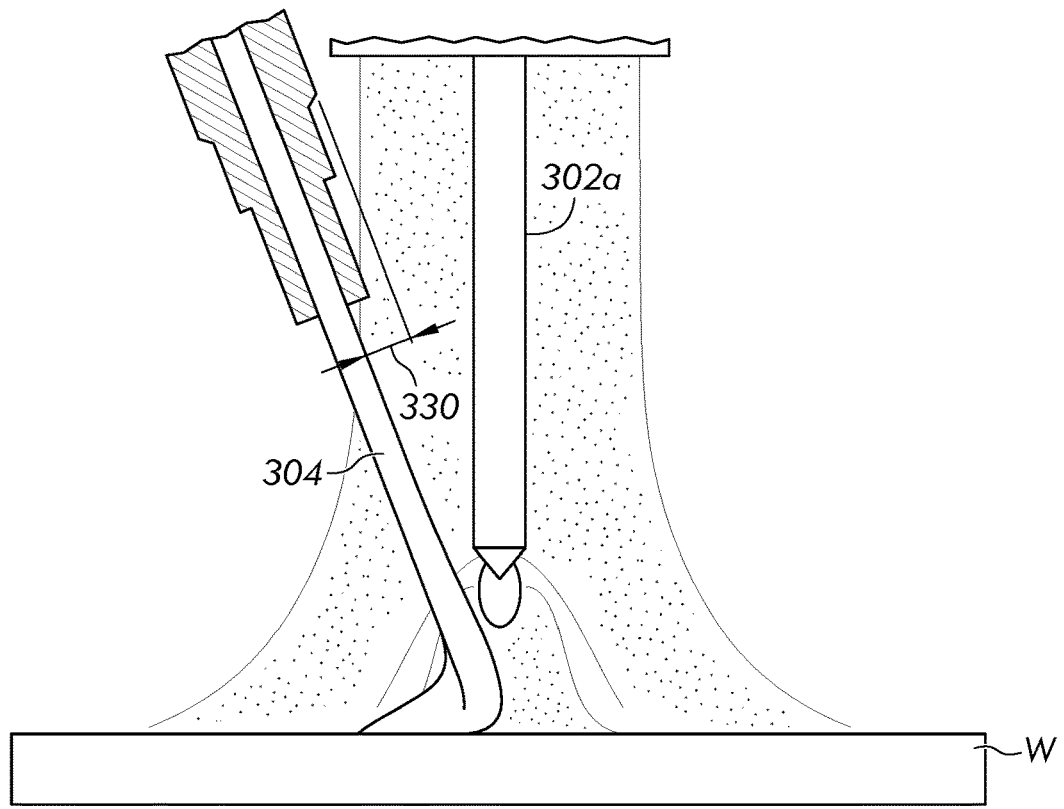
FIG. 7 is a diagram of an exemplary weld process performed by one embodiment of a welding system.

The angle, position, and orientation of the one or more electrodes 302a, 302b, the first welding wire 304, and the second welding wire 306 can be selected to achieve a desired electrode-to-wire distance (EWD) 330 as shown in FIG. 7. It should be noted that for clarity, FIG. 7 depicts only one electrode 302a and one welding wire 304. The EWD 330 can be selected so that deposition is maximized, but also so that the first welding wire 304 and the second welding wire 306 do not cross or touch each other or any of the one or more electrodes 302a, 302b. In one embodiment, the EWD is 1.5 mm, although other larger or smaller distances for the EWD are possible.

Figure 8:
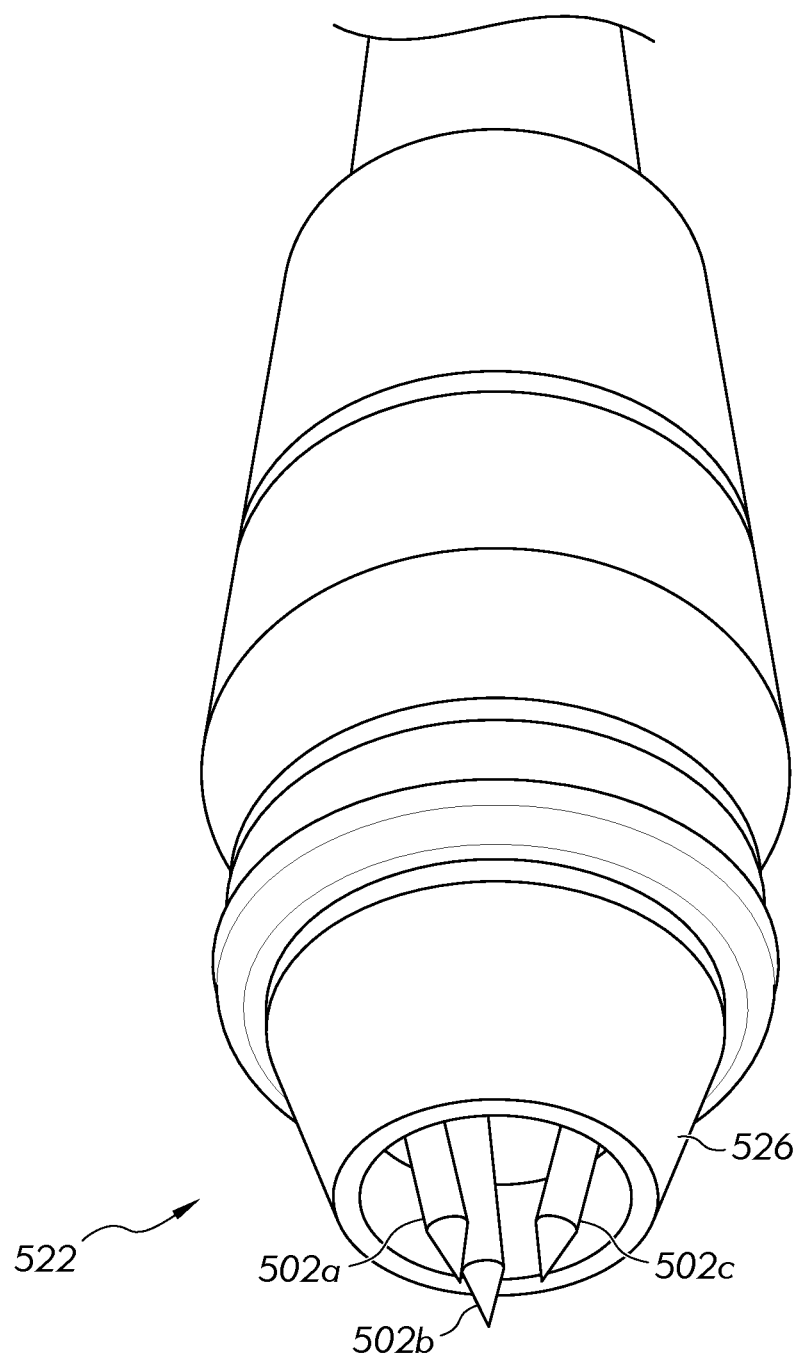
FIG. 8 is a perspective view of a welding torch according to one embodiment of a welding system.
Figure 9:
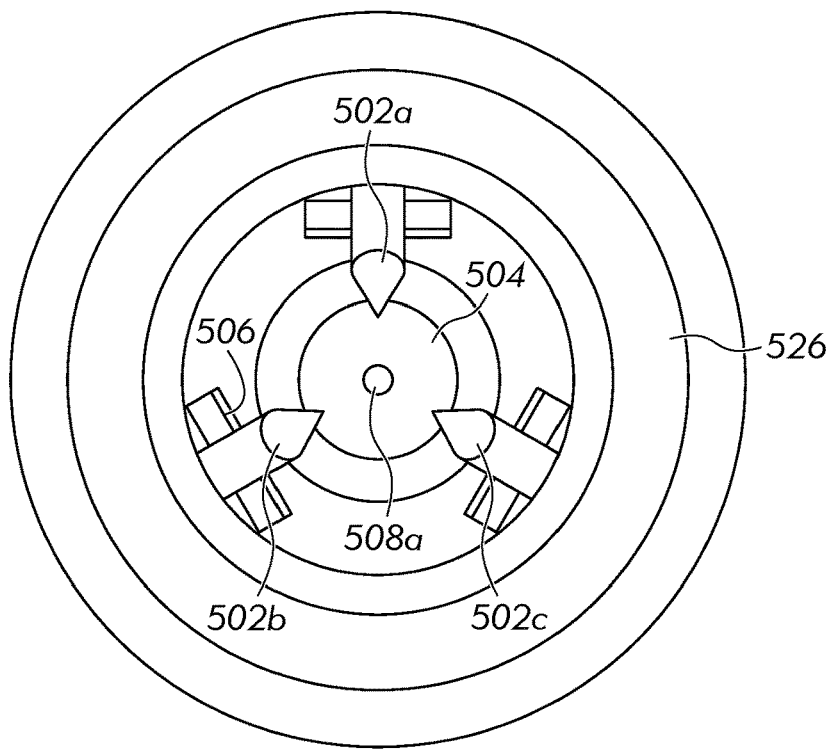
FIG. 9 is a is a distal end view of a welding torch according to one embodiment of a welding system.
Figure 10:
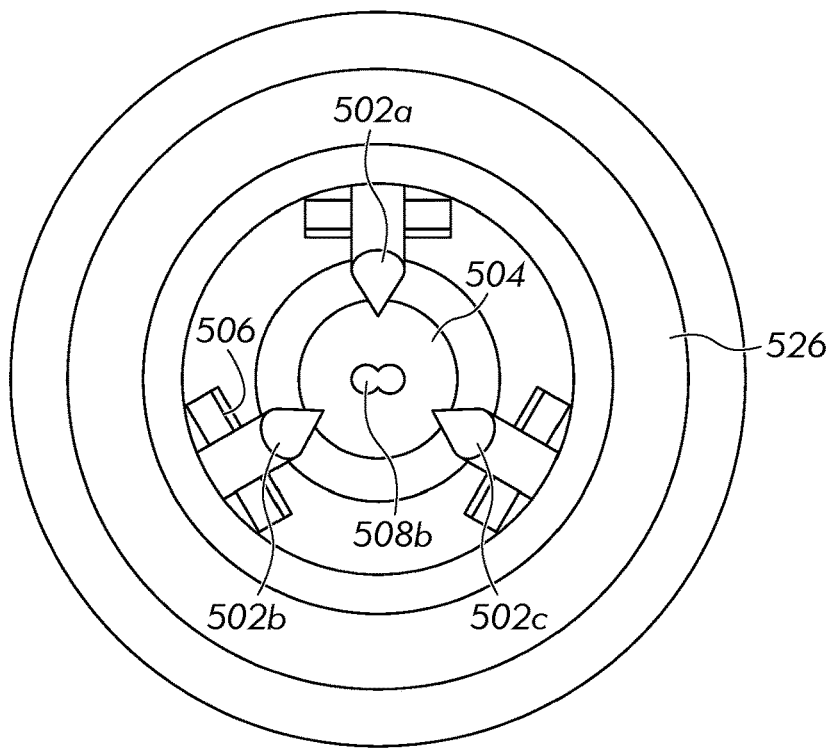
FIG. 10 is a is a distal end view of a welding torch according to one embodiment of a welding system.

FIGS. 8-10 show an example torch head 522 having three tungsten electrodes 502a, 502b, 502c. The tungsten electrodes 502a, 502b, 502c can be arranged symmetrically around the tip 504 within the central bore of the nozzle or gas cup 526. For example, the tungsten electrodes 502a, 502b, 502c can be spaced 120 degrees apart from each other around the tip 504 and its filler wire channel 508a or channels. The electrodes 502a, 502b, 502c are located partially within the gas cup 526 and project past the distal terminal end face of the gas cup, similar to the embodiment shown in FIG. 4. The tip 504 in FIG. 9 has a single circular channel 508a for accommodating one or more filler wires. The tip 504 in FIG. 10 has a filler wire channel 508b having an overlapping circles shape (e.g., a substantially FIG. 8 shape) formed by two overlapping circular bores for conveying separate filler wires. The filler wire or filler wires are fed from the tip 504 between all three tungsten electrodes 502a, 502b, 502c. The torch head 522 can include clamping mechanisms 506 for each electrode that operate as part of a collet mounting system for the electrodes. The clamping mechanism can be formed from a conductive material such as copper to conduct welding current to the electrodes 502a, 502b, 502c. In further embodiments, the torch head 522 can include more than three tungsten electrodes (e.g., 4 or more electrodes) arranged symmetrically or non-symmetrically around the filler wire channel or channels.

The torch heads discussed herein can be implemented by mounting the torch head on the end of a welding gun. The welding gun can be specifically designed for TIG welding, or the welding gun can be designed for a different type of welding such as metal inert gas (MIG) welding or flux-cored welding. Incorporating a mountable torch head onto a welding gun can allow a different type of welding torch (e.g., a MIG gun) to be converted to a semi-automatic TIG welding torch. In certain embodiments, the welding torch can be fully automatic and mounted on a robot, whereas in other embodiments the torch can be handheld.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A gas tungsten arc welding torch, comprising:
a handle;
a nozzle located distal of the handle and having a central bore;
a first tungsten electrode located partially within the central bore of the nozzle;
a second tungsten electrode located partially within the central bore of the nozzle;
at least one filler wire channel in the torch and terminating radially inward of the first tungsten electrode and the second tungsten electrode;
a torch trigger, wherein operation of the torch trigger controls delivery of a first filler wire through the at least one filler wire channel and delivery of a second filler wire through the at least one filler wire channel; and
a wire feed speed control, wherein operation of the wire feed speed control adjusts a wire feed speed of both of the first filler wire and the second filler wire.

2. The gas tungsten arc welding torch of claim 1, wherein the wire feed speed control comprises a thumbwheel.

3. The gas tungsten arc welding torch of claim 1, wherein operation of the torch trigger provides variable control of a welding current level in the first tungsten electrode and the second tungsten electrode from a first current level through a second current level higher than the first current level.

4. The gas tungsten arc welding torch of claim 1, wherein the first filler wire and the second filler wire are energized hot wires heated by electrical current flow through the first filler wire and the second filler wire.

5. The gas tungsten arc welding torch of claim 1, wherein the first filler wire and the second filler wire exit the torch between the first tungsten electrode and the second tungsten electrode.

6. The gas tungsten arc welding torch of claim 1, wherein the first tungsten electrode and the second tungsten electrode extend within the central bore of the nozzle at an inward angle toward the first filler wire and the second filler wire.

7. The gas tungsten arc welding torch of claim 6, wherein the nozzle is rotatable to adjust an orientation of the first filler wire and the second filler wire with respect to the first tungsten electrode and the second tungsten electrode.

8. A gas tungsten arc welding torch, comprising:
a handle;
a nozzle located distal of the handle and having a central bore;
a first tungsten electrode located partially within the central bore of the nozzle;
a second tungsten electrode located partially within the central bore of the nozzle;
at least one filler wire channel in the torch and terminating radially inward of the first tungsten electrode and the second tungsten electrode;
a torch trigger, wherein operation of the torch trigger controls delivery of a first filler wire through the at least one filler wire channel and delivery of a second filler wire through the at least one filler wire channel;
a wire feed speed control, wherein operation of the wire feed speed control adjusts a wire feed speed of both of the first filler wire and the second filler wire; and a third tungsten electrode located partially within the central bore of the nozzle, wherein the first tungsten electrode, the second tungsten electrode, and the third tungsten electrode are spaced 120 degrees apart from each other around the at least one filler wire channel,
wherein the first filler wire and the second filler wire exit the torch between the first tungsten electrode and the second tungsten electrode, and the first tungsten electrode and the second tungsten electrode extend within the central bore of the nozzle at an inward angle toward the first filler wire and the second filler wire.

9. A gas tungsten arc welding torch, comprising:
a handle;
a gas cup;
a first tungsten electrode located partially within the gas cup;
a second tungsten electrode located partially within the gas cup;
at least one filler wire channel in the torch and terminating radially inward of the first tungsten electrode and the second tungsten electrode; and
a torch trigger, wherein operation of the torch trigger controls delivery of a first filler wire through the at least one filler wire channel and delivery of a second filler wire through the at least one filler wire channel.

10. The gas tungsten arc welding torch of claim 9, further comprising a wire feed speed control, wherein operation of the wire feed speed control adjusts a wire feed speed of both of the first filler wire and the second filler wire.

11. The gas tungsten arc welding torch of claim 10, wherein the wire feed speed control comprises a thumbwheel.

12. A gas tungsten arc welding torch, comprising:
a handle;
a gas cup;
a first tungsten electrode located partially within the gas cup;
a second tungsten electrode located partially within the gas cup;
at least one filler wire channel in the torch and terminating radially inward of the first tungsten electrode and the second tungsten electrode; and
a torch trigger, wherein operation of the torch trigger controls delivery of a first filler wire through the at least one filler wire channel and delivery of a second filler wire through the at least one filler wire channel, and wherein operation of the torch trigger provides variable control of a welding current level in the first tungsten electrode and the second tungsten electrode from a first current level through a second current level higher than the first current level.

13. The gas tungsten arc welding torch of claim 9, wherein the first filler wire and the second filler wire are energized hot wires heated by electrical current flow through the first filler wire and the second filler wire.

14. The gas tungsten arc welding torch of claim 9, wherein the first filler wire and the second filler wire exit the torch between the first tungsten electrode and the second tungsten electrode.

15. The gas tungsten arc welding torch of claim 14, wherein the first tungsten electrode and the second tungsten electrode extend within the gas cup at an inward angle toward the first filler wire and the second filler wire.

16. The gas tungsten arc welding torch of claim 15, wherein the gas cup is rotatable to adjust an orientation of the first filler wire and the second filler wire with respect to the first tungsten electrode and the second tungsten electrode.

17. A gas tungsten arc welding torch, comprising:
a handle;
a gas cup;
a first tungsten electrode located partially within the gas cup;
a second tungsten electrode located partially within the gas cup;
at least one filler wire channel in the torch and terminating radially inward of the first tungsten electrode and the second tungsten electrode; and
a torch trigger, wherein operation of the torch trigger controls delivery of a first filler wire through the at least one filler wire channel and delivery of a second filler wire through the at least one filler wire channel; and a third tungsten electrode located partially within the gas cup, wherein the first tungsten electrode, the second tungsten electrode, and the third tungsten electrode are spaced 120 degrees apart from each other around the at least one filler wire channel,
wherein the first filler wire and the second filler wire exit the torch between the first tungsten electrode and the second tungsten electrode, and the first tungsten electrode and the second tungsten electrode extend within the gas cup at an inward angle toward the first filler wire and the second filler wire.

18. A gas tungsten arc welding system, comprising:
a welding torch including:

a handle;

a gas cup having a central bore;

a first tungsten electrode located partially within the central bore of the gas cup;

a second tungsten electrode located partially within the central bore of the gas cup;

at least one filler wire channel in the torch and terminating radially inward of the first tungsten electrode and the second tungsten electrode;

a torch trigger, wherein operation of the torch trigger controls delivery of a first filler wire through the at least one filler wire channel and delivery of a second filler wire through the at least one filler wire channel; and a wire feed speed control, wherein operation of the wire feed speed control adjusts a wire feed speed of both of the first filler wire and the second filler wire;

a welding power source configured to simultaneously supply welding power to both of the first tungsten electrode and the second tungsten electrode; and a wire feeder configured to feed the first filler wire through the at least one filler wire channel and the second filler wire through the at least one filler wire channel at said wire feed speed.

19. The gas tungsten arc welding system of claim 18, wherein the wire feed speed control comprises a thumbwheel.

20. The gas tungsten arc welding system of claim 18, wherein operation of the torch trigger provides variable control of a welding current level in the first tungsten electrode and the second tungsten electrode from a first current level through a second current level higher than the first current level.

21. The gas tungsten arc welding system of claim 18, wherein the first filler wire and the second filler wire are energized hot wires heated by electrical current flow through the first filler wire and the second filler wire.

22. The gas tungsten arc welding system of claim 18, wherein the first filler wire and the second filler wire exit the torch between the first tungsten electrode and the second tungsten electrode.

23. The gas tungsten arc welding system of claim 22, wherein the first tungsten electrode and the second tungsten electrode extend within the central bore of the gas cup at an inward angle toward the first filler wire and the second filler wire.

24. The gas tungsten arc welding system of claim 23, wherein the gas cup is rotatable to adjust an orientation of the first filler wire and the second filler wire with respect to the first tungsten electrode and the second tungsten electrode.

25. A gas tungsten arc welding system, comprising:

a welding torch including:

a handle;

a gas cup having a central bore;

a first tungsten electrode located partially within the central bore of the gas cup;

a second tungsten electrode located partially within the central bore of the gas cup;

at least one filler wire channel in the torch and terminating radially inward of the first tungsten electrode and the second tungsten electrode;

a torch trigger, wherein operation of the torch trigger controls delivery of a first filler wire through the at least one filler wire channel and delivery of a second filler wire through the at least one filler wire channel; and a wire feed speed control, wherein operation of the wire feed speed control adjusts a wire feed speed of both of the first filler wire and the second filler wire;

a welding power source configured to simultaneously supply welding power to both of the first tungsten electrode and the second tungsten electrode; and a wire feeder configured to feed the first filler wire through the at least one filler wire channel and the second filler wire through the at least one filler wire channel at said wire feed speed; and a third tungsten electrode located partially within the central bore of the gas cup, wherein the first tungsten electrode, the second tungsten electrode, and the third tungsten electrode are spaced 120 degrees apart from each other around the at least one filler wire channel, and p1 wherein the first filler wire and the second filler wire exit the torch between the first tungsten electrode and the second tungsten electrode, and the first tungsten electrode and the second tungsten electrode extend within the central bore of the gas cup at an inward angle toward the first filler wire and the second filler wire.

\* \* \* \* \*